United States Patent [19]

Iida

[11] Patent Number: 5,575,266
[45] Date of Patent: Nov. 19, 1996

[54] METHOD OF OPERATING GASEOUS FUELED ENGINE

[75] Inventor: Yoshikatsu Iida, Iwata, Japan

[73] Assignee: Yamaha Hatsudoki Kabushiki Kaisha, Shizuoka-ken, Japan

[21] Appl. No.: 297,376

[22] Filed: Aug. 29, 1994

[30] Foreign Application Priority Data

Aug. 31, 1993 [JP] Japan ................................. 5-216381
Aug. 31, 1993 [JP] Japan ................................. 5-216382

[51] Int. Cl.$^6$ ............................. F02D 41/14; F01N 3/00
[52] U.S. Cl. ....................... 123/680; 123/683; 123/688; 123/702; 60/285
[58] Field of Search .................................. 123/679, 680, 123/681, 682, 683, 685, 688, 699, 700, 701, 702, 525, 527, 585; 60/277, 276, 285

[56] References Cited

U.S. PATENT DOCUMENTS

| | | | |
|---|---|---|---|
| 3,996,908 | 12/1976 | Brown, III et al. | 123/585 |
| 3,996,909 | 12/1976 | Fischer | 123/585 |
| 4,089,311 | 5/1978 | Brettschneider et al. | 123/702 |
| 4,216,757 | 8/1980 | Romann | 123/179.15 |
| 4,285,700 | 8/1981 | Fox | 48/180.1 |
| 4,347,824 | 9/1982 | Pierson | 123/527 |
| 4,369,749 | 1/1983 | Sugi | 123/439 |
| 4,376,369 | 3/1983 | Horikoshi et al. | 60/276 |
| 4,385,613 | 5/1983 | Yoshida et al. | 123/685 |
| 4,404,947 | 9/1983 | Swanson | 123/527 |
| 4,413,607 | 11/1983 | Batchelor et al. | 123/590 |
| 4,457,279 | 7/1984 | Teramura et al. | 123/439 |
| 4,485,792 | 12/1984 | van der Weide | 123/527 |
| 4,492,204 | 1/1985 | Bertsch et al. | 123/685 |
| 4,492,205 | 1/1985 | Jundt et al. | 123/688 |
| 4,517,134 | 5/1985 | Nakamura et al. | 261/39.2 |
| 4,528,957 | 7/1985 | Jundt et al. | 123/688 |
| 4,541,397 | 9/1985 | Young | 123/527 |
| 4,545,350 | 10/1985 | Nakamura et al. | 123/439 |
| 4,554,896 | 11/1985 | Sougawa | 123/179.16 |
| 4,572,149 | 2/1986 | Hasegawa et al. | 123/700 |
| 4,589,397 | 5/1986 | Stankewitsch | 123/590 |
| 4,606,319 | 8/1986 | Silva | 123/525 |
| 4,628,883 | 12/1986 | Kataoka | 123/682 |
| 4,638,783 | 1/1987 | Snyder | 123/527 |
| 4,686,951 | 8/1987 | Snyder | 123/527 |
| 4,696,278 | 9/1987 | Ito et al. | 123/493 |
| 4,699,630 | 10/1987 | Lee et al. | 48/180.1 |
| 4,719,888 | 1/1988 | Kobayashi et al. | 123/683 |
| 4,742,808 | 5/1988 | Blumel et al. | 123/688 |
| 4,774,909 | 10/1988 | Dolderer | 123/1 A |
| 4,813,390 | 3/1989 | Bennett | 123/577 |
| 4,813,394 | 3/1989 | St. Clair | 123/527 |

(List continued on next page.)

FOREIGN PATENT DOCUMENTS

| | | |
|---|---|---|
| 0346989 | 12/1989 | European Pat. Off. . |
| 3321424 | 8/1984 | Germany . |
| 0217747 | 12/1983 | Japan . |
| 0176444 | 10/1984 | Japan . |
| 0510585 | 10/1992 | Japan . |
| 1327513 | 8/1973 | United Kingdom . |

OTHER PUBLICATIONS

European Search Reported dated Oct. 2, 1993.
Patent Abstracts of Japan, vol. 12, No. 251 (M–718) 15 Jul. 1988 & JP–A–63 038 648 (Daihatsu Motor Co Ltd) 19 Feb. 1988.
European Search Report, Oct. 1995.

*Primary Examiner*—Willis R. Wolfe
*Attorney, Agent, or Firm*—Knobbe, Martens, Olson & Bear

[57] ABSTRACT

A gaseous fueled engine and method for controlling the gaseous fuel supply using a feedback control to maintain a stoichiometric mixture under all normal running conditions. The feedback control is discontinued under certain running conditions and control is provided in another method so as to accommodate situations such as starting, conditions when the catalyst associated with the engine is overheated, conditions when the engine is running at wide open throttle to avoid the possibility of catalyst overheating and conditions of rapid deceleration so as to reduce the fuel supply and avoid overly rich exhaust gases when the engine is operating as a pump under extreme deceleration.

64 Claims, 8 Drawing Sheets

U.S. PATENT DOCUMENTS

| | | | |
|---|---|---|---|
| 4,829,957 | 5/1989 | Garretson et al. | 123/27 GE |
| 4,834,050 | 5/1989 | Uranishi et al. | 123/699 |
| 4,843,558 | 6/1989 | Bergmann et al. | 364/431.03 |
| 4,858,583 | 8/1989 | Sonntag | 123/527 |
| 4,864,991 | 9/1989 | Snyder et al. | 123/344 |
| 4,867,127 | 9/1989 | Quirchmayr et al. | 123/527 |
| 4,870,933 | 10/1989 | Mizuno | 123/325 |
| 4,915,081 | 4/1990 | Fujimoto et al. | 123/682 |
| 4,938,199 | 7/1990 | Sato et al. | 123/585 |
| 4,953,516 | 9/1990 | van der Weide et al. | 123/527 |
| 4,970,858 | 11/1990 | Matsuoka | 60/274 |
| 5,014,668 | 5/1991 | Klenk et al. | 123/683 |
| 5,058,556 | 10/1991 | Fukuma et al. | 123/682 |
| 5,076,245 | 12/1991 | Jones | 123/527 |
| 5,101,799 | 4/1992 | Davis et al. | 123/527 |
| 5,150,673 | 9/1992 | Hoshiba et al. | 123/179.15 |
| 5,150,690 | 9/1992 | Carter et al. | 123/527 |
| 5,172,678 | 12/1992 | Suzuki | 123/688 |
| 5,201,173 | 4/1993 | Fujimoto et al. | 60/277 |
| 5,337,722 | 8/1994 | Kurihara et al. | 123/527 |
| 5,357,938 | 10/1994 | Bedford et al. | 123/685 |

METHOD OF OPERATING GASEOUS FUELED ENGINE

BACKGROUND OF THE INVENTION

This invention relates to a gaseous fueled engine and more particularly to an improved method of operating a gaseous fueled engine having a feedback control system for maintaining the desired optimum fuel-air ratio under a wide variety of conditions.

In the interest of conserving natural resources and preserving the ecology, the use of alternate fuels for internal combustion engines are being investigated. Gaseous fuels such as propane, butane, and the like (commonly referred to as LPG) have been considered as optimum sources. In addition to offering greater emission control and conserving natural resources, these fuels have been found in some instances to offer longer engine life and extended service intervals.

One form of gaseous fueled engine that has proven to be quite efficient employs a charge former in the form of an air-valve type of carburetor which is fed with gaseous fuel from a source where the fuel is stored under high pressure as a liquid or partially as a liquid. The air valve carburetor tends to maintain the desired air-fuel ratio under widely varying engine conditions. However, in order to assure more effective air-fuel ratio control, a system is provided that includes an air bleed that mixes atmospheric air with the fuel supplied to the charge former so as to maintain the desired fuel-air ratio. A sensor such as an oxygen sensor is placed in the exhaust system, and the amount of air bleed is controlled by a feedback system.

An example of an effective system of this type may be found in the United States Letters Patent, entitled "Fuel Control and Fuel Feed System for Gas-Fueled Engine," U.S. Pat. No 5,337,722, issued Aug. 16, 1994, and assigned to the Assignee hereof.

Although feedback control is a very effective control for such engines, there are some conditions of engine operation wherein feedback control may not be satisfactory or the best method of control. Under such conditions it is possible to control the fuel-air ratio by memorizing maps in the ECU or CPU for the system, which maps will be indicative of the desired fuel-air ratio for the various conditions. However, the use of such additional maps and the fact that the system may also require a separate map for each type of fuel that may be used can put quite a burden on the memory capacity of the ECU.

For example, it is frequently the practice to incorporate a catalytic exhaust treatment system in the engine. These catalytic systems are normally positioned in the exhaust manifold or exhaust system, and to be operative must be maintained at a relatively high temperature. However, there is also a risk that the conditions of operation of the engine may be such that the catalyst may become overheated. The use of feedback control under such overheating conditions can, in fact, at times cause the problem to be aggravated, and thus it is necessary to utilize a system other than feedback control. If this control is done by a memory based upon certain conditions, then the aforenoted problems with memory capacity can be encountered.

Another condition where feedback control is not necessarily desirable is during starting, particularly cold starting. Frequently an arrangement is provided for enriching the mixture during cold starting. This thus requires added memory capacity for determining the amount of fuel for this respective cold-starting condition. Alternatively, rather than employing the air bleed for the enrichment, many systems include separate cold-starting enrichment circuits. This obviously increases the cost and complexity of the system.

Another running condition when feedback control may not be desirable or necessary is during extreme decelerations. It is known that under extreme decelerations the throttle valve is closed and the induction system vacuum is high. Thus, a very rich amount of fuel may be drawn into the engine on such deceleration conditions, since the engine actually operates like a pump under this condition. It has, therefore, been proposed to provide a fuel shutoff, which will shut off the fuel on deceleration. This however adds to the cost of and further complicates the system.

If, however, feedback control is also employed with a shut off deceleration valve, then the feedback control will tend to try to enrich the mixture when the fuel is shut off because the exhaust sensor will sense a lean mixture. This attempt at enrichment will cause a shutting down of the air bleed, and upon reinitiation of normal operation, the mixture will be too rich and problems can be encountered.

It is, therefore, a principal object of this invention to provide an improved gaseous fueled engine and control system therefor that employs feedback control for the primary control but which offers other forms of control not requiring memorized values in the event certain abnormal running conditions are encountered.

It is a further object of this invention to provide a feedback control system for a gaseous fueled internal combustion engine wherein the feedback control is discontinued under certain nonstandard or abnormal conditions and is resumed in such a way as to accommodate the return to normal running from the abnormal condition.

It is a further object of this invention to provide an improved air-fuel control arrangement for a gaseous fueled engine to accommodate the situation of catalyst overheating.

It is a still further object of this invention to provide an improved air-fuel control and method for a gaseous fueled engine for accommodating the start-up and idle operation.

It is a still further object of this invention to provide an improved air-fuel control arrangement for a gaseous fueled engine to accommodate normal feedback control, but a different form of control under decel conditions and without a shut off valve.

SUMMARY OF THE INVENTION

The various features of this invention, including the operational methods therefor, are adapted to be embodied in a gaseous fueled engine having an induction system including a charge former for supplying a fuel-air mixture to the engine and which comprises an induction passage for receiving atmospheric air and a fuel supply circuit for receiving gaseous fuel from a source of gaseous fuel stored under pressure and mixing the fuel with the air in the induction passage for forming a fuel-air mixture for the engine. An air bleed passage communicates atmospheric air with the fuel supply circuit. An automatic air bleed valve is positioned in the air bleed passage for controlling the amount of air bled into the fuel supply circuit to control the mixture strength. An engine combustion sensor is provided for detecting the air-fuel ratio, and feedback control means receive the signals from the combustion sensor and control the automatic air bleed valve to maintain the desired air-fuel ratio.

In accordance with a method for practicing the invention, the feedback control is discontinued in response to a certain condition of the engine, and the automatic air bleed valve is controlled independently of the feedback control under this condition.

In accordance with an apparatus for performing this function, means are provided for disabling the feedback control under certain engine conditions and controlling the automatic air bleed valve in a method other than the feedback control method.

The method and apparatus may be employed to provide non-feedback control under a condition of overheating of a catalyst in the exhaust system.

The method and apparatus also may be employed for controlling the engine during cold start-up.

The method and apparatus may also be employed for maintaining the desired idle speed during start-up.

The method and apparatus may also be employed for reducing the amount of fuel supplied to the engine during extreme decelerations and returning to normal feedback control when the deceleration condition is passed without requiring the use of a separate decel fuel shut off valve.

DETAILED DESCRIPTION OF THE PREFERRED EMBODIMENTS OF THE INVENTION

Figure 1:
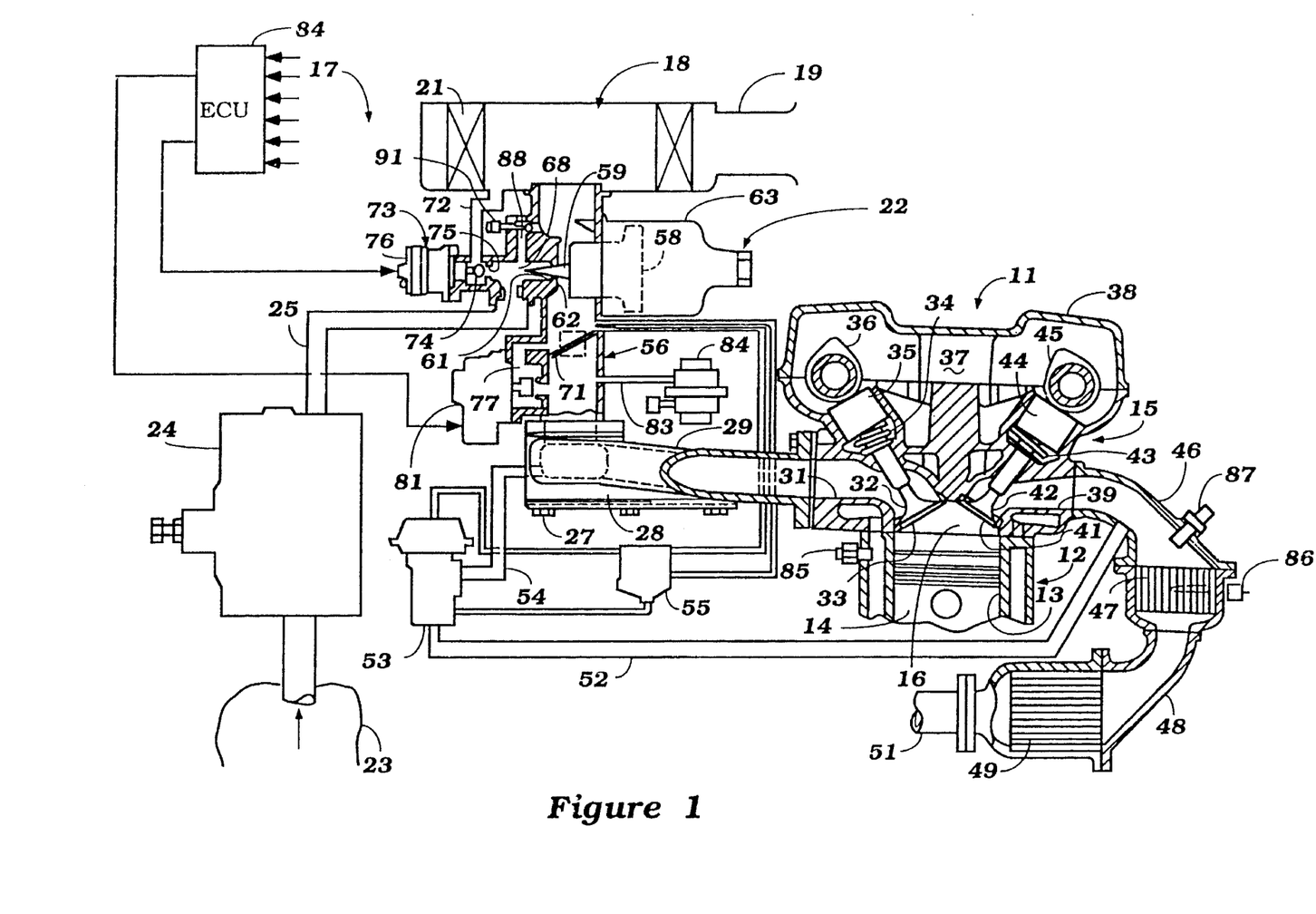
FIG. 1 is a partially schematic cross-sectional view taken through portions of an internal combustion engine constructed and operated in accordance with an embodiment of the invention.

Referring now in detail to the drawings and initially primarily to FIG. 1, an internal combustion engine constructed in accordance with an embodiment of the invention is shown partially and is identified generally by the reference numeral 11. The engine 11 is depicted only partially and by way of a cross-sectional view through a single cylinder because the invention deals primarily with the charge-forming system for the engine and its control. Therefore, when any details of the engine 11 are not described, they may be considered to be of any conventional type as well known in this art.

For reference purposes, the engine 11 is comprised of a cylinder block, indicated generally by the reference numeral 12, which in the illustrated embodiment is of the in-line multiple cylinder type and has cylinder bores 13 formed in the cylinder block 12. Although the invention is described in conjunction with an in-line engine, it will be readily apparent to those skilled in the art how the invention can be employed with engines having other cylinder configurations. Furthermore, although the invention is described in conjunction with a four-cycle reciprocating engine, it should be readily apparent to those skilled in the art that the various features of the invention can also be employed with engines operating on a two-stroke principle or engines operating on other principles and engines other than reciprocating engines, such as rotary engines.

Pistons 14 are slidably supported within the cylinder bores 13 and are connected in a well-known manner by connecting rods to a crankshaft (not shown). Since the invention deals primarily with the induction system for the engine and the associated exhaust system and feedback control, the lower end of the engine 11 has not been depicted in the drawings.

A cylinder head assembly 15 is affixed to the cylinder block 12 in a known manner and has individual recesses 16 which cooperate with the cylinder bores 13 and pistons 14 to form the individual combustion chambers of the engine. An induction and exhaust system, to be described, is formed in the cylinder head assembly 15 for delivering a combustible mixture to the combustion chambers 16, firing them and exhausting the burned charge to the atmosphere.

The induction system, in accordance with an embodiment of the invention, is identified generally by the reference numeral 17 and will be described in more detail later by reference to FIG. 2. However, the induction system 17 includes an air cleaner 18 having an atmospheric air inlet 19 through which atmospheric air is drawn and a filter element 21 for filtering foreign particles from the inducted air.

This air is then delivered to a charge former, indicated generally by the reference numeral 22, and which has a construction as will be best described by reference to FIG. 2. This charge former 22 receives a gaseous fuel from a source of such fuel under pressure, normally stored as a liquid, which is shown partially and as identified by the reference numeral 23. The gaseous fuel is delivered to a pressure regulator 24 that reduces the pressure in two stages to a pressure less than atmospheric, as described in the aforenoted patent and is then delivered through a conduit 25 the fuel discharge circuit or circuits of the charge-forming device 22, and the manner in which this is done will be described later in more detailed reference to FIG. 2.

Continuing on to describe the induction system 17, the fuel-air mixture that has been formed by the carburetor 22 is then delivered to an intake manifold, indicated generally by the reference numeral 27, and more specifically to a plenum chamber 28 formed at the inlet thereof. The inlet manifold 27 has a plurality of runners, one being shown in FIG. 1 and is identified by the reference numeral 29, that communicate with intake passages 31 formed in the cylinder head 15 at one side thereof in a well-known manner.

In the illustrated embodiment, each combustion chamber 16 is provided with two intake valves 32 and which are served by respective intake passages 31 or by a Siamesed intake passage. These intake valves 32 cooperate with respective valve seats 33 formed in the cylinder head 15 to control the communication with the combustion chamber 16. Coil compression springs 34 normally urge the intake valves 32 to their closed position. Thimble tappets 35 are slidably supported within the cylinder head 15 and are operated by the lobes of an intake camshaft 36 for opening the intake valves 32 in a well-known manner.

The intake camshaft 36 is driven from the crankshaft of the engine at one-half crankshaft speed, as is well known in this art. The camshaft 36 is contained within a cam chamber 37 formed at the upper end of the cylinder head 15 and which is enclosed by a cam cover 38 in a well-known manner.

The combustible charge which is delivered to the combustion chamber 16 by the induction system as thus far described is then fired by one or more spark plugs mounted in the cylinder head 15 in a well-known manner. This charge can then exit the combustion chambers through exhaust passages 39 formed in the cylinder head 15 on the side opposite the intake passages 31. Valve seats 41 are provided at the combustion chamber side of the exhaust passages 39, and the flow through them is controlled by a pair of exhaust valves 42 also mounted in the cylinder head 15 on this side of the engine. Coil compression springs 43 urge the exhaust valves 42 to their closed position.

Thimble tappets 44 are slidably supported within the cylinder head 15 and are operated by means of the lobes of an exhaust camshaft 45 that is journaled in the cam chamber 37 and driven at one-half camshaft speed along with the intake camshaft 36 by any known type of cam drive. It should be noted that although the invention is described in conjunction with a four-valve-per-cylinder engine, the invention can be utilized with engines of the four-cycle type having other valving arrangements. As has already been noted, the invention can also be employed with ported or rotary engines.

An exhaust manifold 46 is affixed to the exhaust side of the cylinder head 15 and registers with the exhaust passages 39 for collecting the exhaust gases and discharging them to a common outlet in which a first catalyst bed 47 of any desired type may be positioned. It is desirable to maintain the first catalyst bed as close to the exhaust passages 39 as possible so as to ensure rapid heating of the catalyst bed 47 and effective operation thereof.

An exhaust pipe 48 communicates with the downstream side of the catalyst bed 47 and with the upstream side of a second catalyst bed 49, which may also be of any known type. The catalyst bed 49 discharges the exhaust gases to the atmosphere through an exhaust system which may include one or more mufflers and which is shown only partially and is identified generally by the reference numeral 51.

In order to control certain emissions, for example, those of nitrous oxides or the like, an exhaust gas recirculation system is also incorporated, which includes an EGR line 52 that is tapped off of the exhaust manifold 46 and which delivers the exhaust gases to an EGR valve 53. The EGR valve 53 selectively returns a portion of the exhaust gases to the engine through its induction system by discharging the exhaust gases through a conduit 54 into the plenum chamber 28 of the intake manifold 27. An EGR control 55 of any known type operates the EGR valve 53 to provide the desired strategy for control.

The engine 11 and auxiliaries as thus far described may be considered to be conventional, and for that reason, further details of the conventional components of the engine are not believed to be necessary to permit those skilled in the art to understand and practice the invention.

The charge-forming device or carburetor 22, which forms an important portion of the invention, is depicted in more detail in FIG. 2 and will now be described in more detail by reference to that figure. The carburetor 22 includes a main body assembly 56 that forms an induction passage 57, which communicates at its inlet end with the air cleaner 18 and at its outlet end with the plenum chamber 28 of the intake manifold 27.

The carburetor 22 is of the constant depression or air valve type and includes a sliding piston 58 that has an end portion which carries a metering rod 59 that is received within a metering jet 61 formed in a portion 62 of the induction passage 57 in confronting relation to the sliding piston 58. The piston 58 is received within a housing assembly 63 and defines a first chamber A that is exposed to the pressure at the throat of the carburetor 22 defined by the sliding piston 58 and induction passage portion 62 through a bleed opening 64. A coil compression spring 65 is received in the chamber A and normally urges the sliding piston 58 to a direction to restrict the cross-sectional area of the throat.

The remaining chamber B defined by the piston 58 and housing 63 is exposed to atmospheric air pressure through an atmospheric air pressure port 66 which actually faces the inner side of the air cleaner 18 and thus senses the pressure of the air that will be introduced into the induction passage 57. As is well known in this art, the piston 58 will move to a position dependent upon the pressure difference to maintain a substantially constant pressure drop across the throat of the carburetor 22. At the same time, the amount of fuel metered by the metering rod 59 will vary depending upon the piston position.

As has been noted, fuel from the source 23 is provided to the fuel discharge circuit of the carburetor 22 from the shut-off valve 26. The conduit 25 from the pressure regulator 24 communicates with a mixing chamber 68 formed at the base of the metering jet 61. The conduit 25 is provided with a metering orifice 69 that leads to the mixing chamber 68 for controlling the amount of fuel which can enter the chamber 68.

A throttle valve 71 is positioned in the induction passage 57 downstream of the sliding piston 58 and is connected in a well-known manner to a remotely positioned operator-controlled throttle.

As will become apparent, the metering jet 61 and metering rod 59 provide the desired fuel-air ratio under substantially all engine running conditions. However, fine-tuning adjustment is made by a feedback control system, which will be described, but which includes an air bypass system for bleeding controlled amount of air into the mixing chamber 68 for providing fine tuning of the air-fuel ratio so as to ensure that the engine runs on a stoichiometric condition under all running conditions.

This system includes an air bleed passage 72 which extends from the air filter 18 downstream of the filter element 21 to an automatic air bleed valve, indicated generally by the reference numeral 73, and which includes a valving element 74 that cooperates with a metering orifice 75 so as to control the flow of air into the mixing chamber 68. The valve element 74 is controlled by a servo or stepper motor 76 which operates in step increments so as to control the degree of closure of the orifice 75 and, accordingly, the amount of air bled into the mixing chamber 68 for fine tuning of the mixture strength to maintain a λ1 condition.

Although idle speed of the engine 11 can be controlled by controlling the position of the throttle valve 71 at idle, a more accurate idle control is provided by an idle bypass circuit 77 which is formed in the carburetor body 56 and which extends from a position slightly above the idle position of the throttle valve 71 to a position below it defined by an idle discharge orifice 78. An idle control valve 79 is operatively connected to a further, idle stepper motor 81, which is controlled so as to provide control of the idle speed of the engine without necessitating adjustment of the idle speed of the throttle valve 71.

The remaining components of the charge-forming system and the controls therefor will now be described primarily by reference to FIG. 1. One of these controls shuts off or reduces the flow of fuel to the engine 11 during extreme deceleration conditions so as to avoid fuel being drawn into the engine through its induction system when it acts like a pump on extreme deceleration.

Therefore, there is provided an intake manifold vacuum sensor 82 that has a pressure conduit 83 to sense the pressure in the induction system downstream of the throttle valve 71. During extreme decelerations, there will be a large manifold vacuum exerted, and this, coupled with other factors, can be employed as a condition for increasing the air bleed and this and other controls are operated by an ECU 84, which controls a number of engine functions and which receives a number of input signals from various sensors, some of which will be described. It should be understood that although certain types of sensors are to be described, it will be obvious to those skilled in the art how other parameters may also be employed for engine control.

Among the other sensors which may be employed for sending signals to the ECU 84 for various engine control functions is a water-temperature sensor 85 that is tapped into the cooling jacket of the cylinder block 12 and which outputs a signal indicative of engine water temperature. In addition, a temperature probe 86 extends into at least the catalyst bed 47 to provide a signal indicative of its temperature.

The important control for the charge-forming system which entails the invention is the use of an exhaust sensor 87, which in the illustrated embodiment is an oxygen ($O_2$) sensor that is placed into the exhaust manifold 46 upstream of the first catalyst bed 47. This oxygen sensor, as is typical with this type of sensor, will only output a signal when the oxygen condition is above a certain level, and this occurs when the air-fuel ratio mixture A/F is richer than the stoichiometric desired air-fuel ratio, a detection signal will be outputted. These sensors do not become operative until they are at more than a certain temperature, such as 350° C., and hence, the sensor 87 will not output a signal when the air-fuel mixture is leaner than stoichiometric or when the exhaust temperature is less than 350° C. Although it may be possible to employ other types of sensors for the control, certain aspects of the control routine are particularly useful with this type of sensor. However, those skilled in the art will readily understand how the arrangement can be employed in connection with other types of sensors; for example, sensors which emit a detection signal when the fuel-air mixture is leaner than the theoretical stoichiometric ratio for a given engine running condition.

Figure 3:
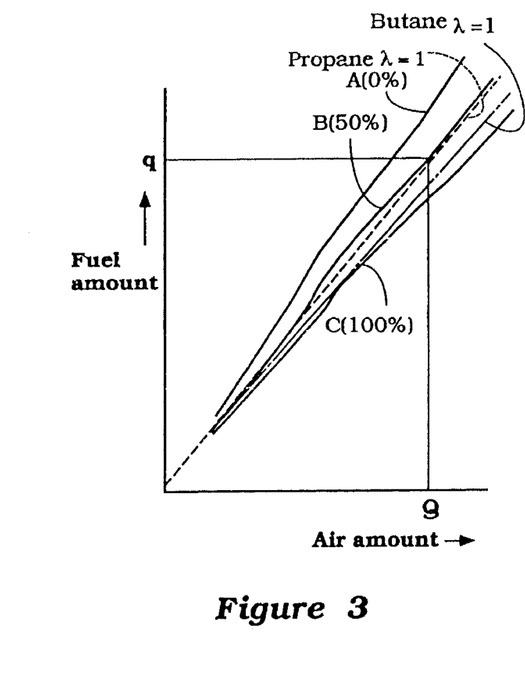
FIG. 3 is a graphical view showing the fuel volume flow versus air intake volume for the design specification engine employing either a butane-type fuel, as shown by the dot-dash line, or a propane-type fuel, as shown by the broken line.

Basically, the ECU 84 is programmed so as to adjust the amount of air bleed by the air bleed control valve 74 by actuating the stepper motor 76 in response to output signals from the sensor 87 once it is at its operating temperature. Basically, the system is designed so that upon initial start-up and with all new components, the valve 74 will be positioned at a point that is at approximately one-half of its total travel, i.e., at its 50-percent position, as shown in FIG. 3. FIG. 3 shows in broken-line curve the optimum or stoichiometric amount of fuel flow q in response to air intake flow Q for propane. This broken line is the λ1 condition. The carburetor 22 is adjusted and jetted so as to attempt to maintain this ratio as close as possible when the valve 74 is set at its 50-percent position, as shown in FIG. 3 by the 50-percent curve B. Thus, if the air-fuel ratio varies on either side (rich or lean) from the line B, the stepper motor 76 is actuated accordingly so as to maintain the air-fuel ratio at the λ1 condition. This curve also shows the relationship of air-fuel ratios that will exist when the valve 74 is fully closed (curve A, zero percent) or fully opened (curve C, 100 percent).

The dot-dash line curve of FIG. 3 shows the stoichiometric ratio if the fuel employed is primarily butane, as opposed to propane, but the same principle would apply.

Figure 4:
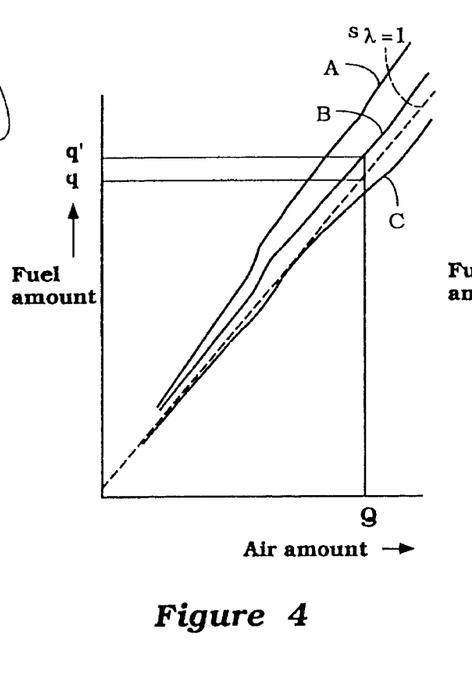
FIG. 4 is a graphical view, in part similar to FIG. 1, and shows the condition of one way in which the system may deteriorate due to age and using the example of operation on propane fuel.
Figure 5:
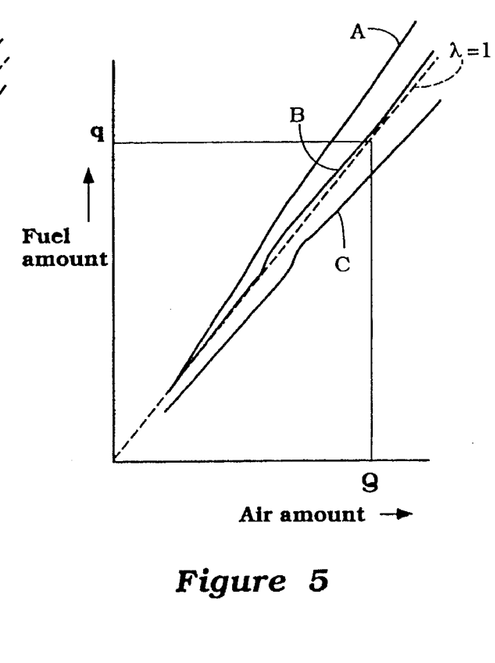
FIG. 5 is a graphical view, in part similar to FIGS. 3 and 4, and shows how the system can be returned to normal by manual adjustment.

After the engine has run for some time period and/or as the components wear, the air-fuel ratio will drift slightly, although the feedback control will still maintain the air bleed valve 74 in a condition to maintain the λ1 situation. This is shown in FIG. 4, wherein the system drifts toward the rich side, and hence, additional air bleed is required. It will be seen that if this condition prevails, then the stepper motor 76 may not have a sufficient range of movement to maintain the λ1 condition under all running conditions. Therefore, in accordance with an embodiment of the invention, the system is provided with a manually adjustable bypass system so as to make adjustments and bring the condition as shown in FIG. 4 back into the condition as shown in FIG. 5 by bleeding either less or more air into the system, depending upon the direction of drift.

Figure 2:
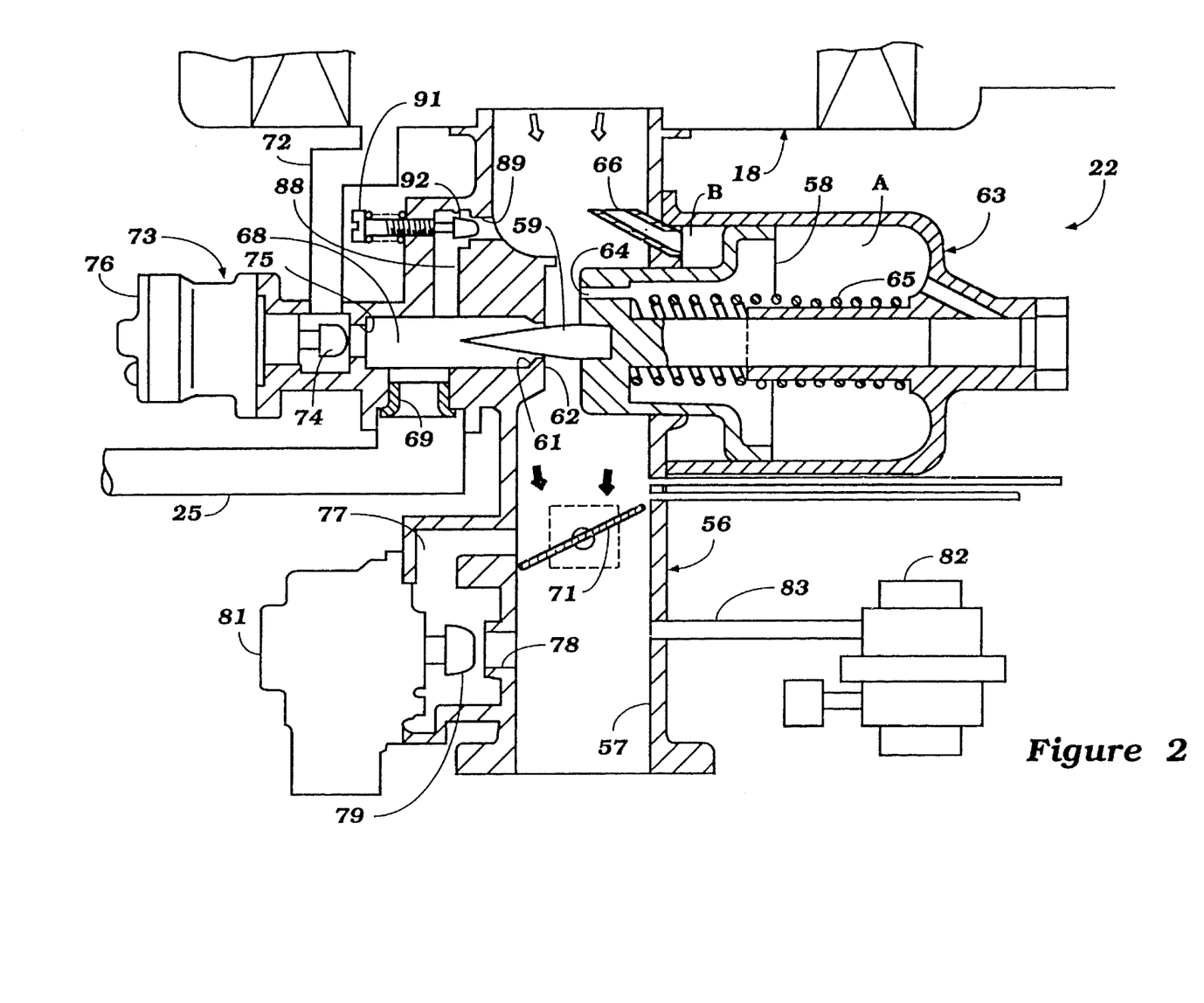
FIG. 2 is an enlarged cross-sectional view taken through the charge former and certain auxiliary components therefor.

This bleed system includes, as shown in FIGS. 1 and 2, an air bleed passage 88 that extends from an inlet port 89 positioned upstream in the induction passage 57 from the sliding piston 58 and downstream from the air cleaner 18. This air bleed passage 88 communicates with the mixing chamber 68. A manually adjustable valve 91 having a valving element 92 cooperates with the bleed opening 89 so as to control the amount of air bled manually into the system. This adjustment of the valve 91 is done only infrequently and may be done either manually, or if desired, an automatic adjustment mechanism may be incorporated, which actuates at predetermined mileage or time intervals. However, this adjustment of the valve 91 is not something that is done continuously during the engine operation, but is only done during service intervals or when the wear of the system or its age requires adjustment.

One actual procedure whereby this adjustment may be made is to run the engine in a hot idle condition and allow the stepper motor 76 to move the valve element 74 to obtain the λ1 condition. If this movement involves positioning other than at the mid-position, then by opening or closing the bleed valve 94, the system can be adjusted to bleed in either less or more additional air so that on the feedback control the stepper motor 76 will position the valve 74 in the 50-percent position to maintain the λ1 condition. When this has been accomplished, then the appropriate adjustment will have been made and need not be made again until after a fairly long time period.

Figure 9:
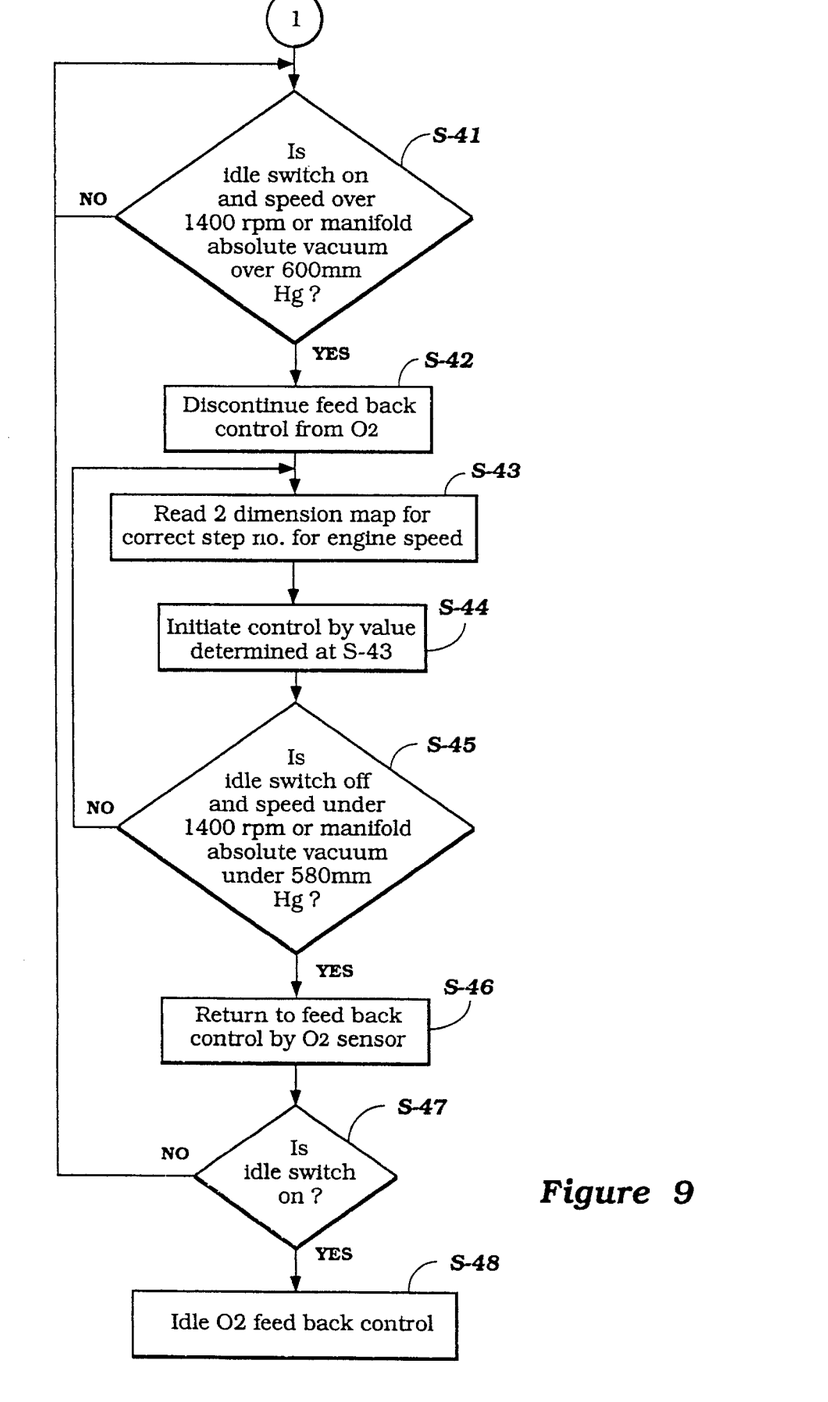
FIG. 9 is a block diagram showing the engine control routine for fuel cutoff under rapid deceleration.
Figure 10:
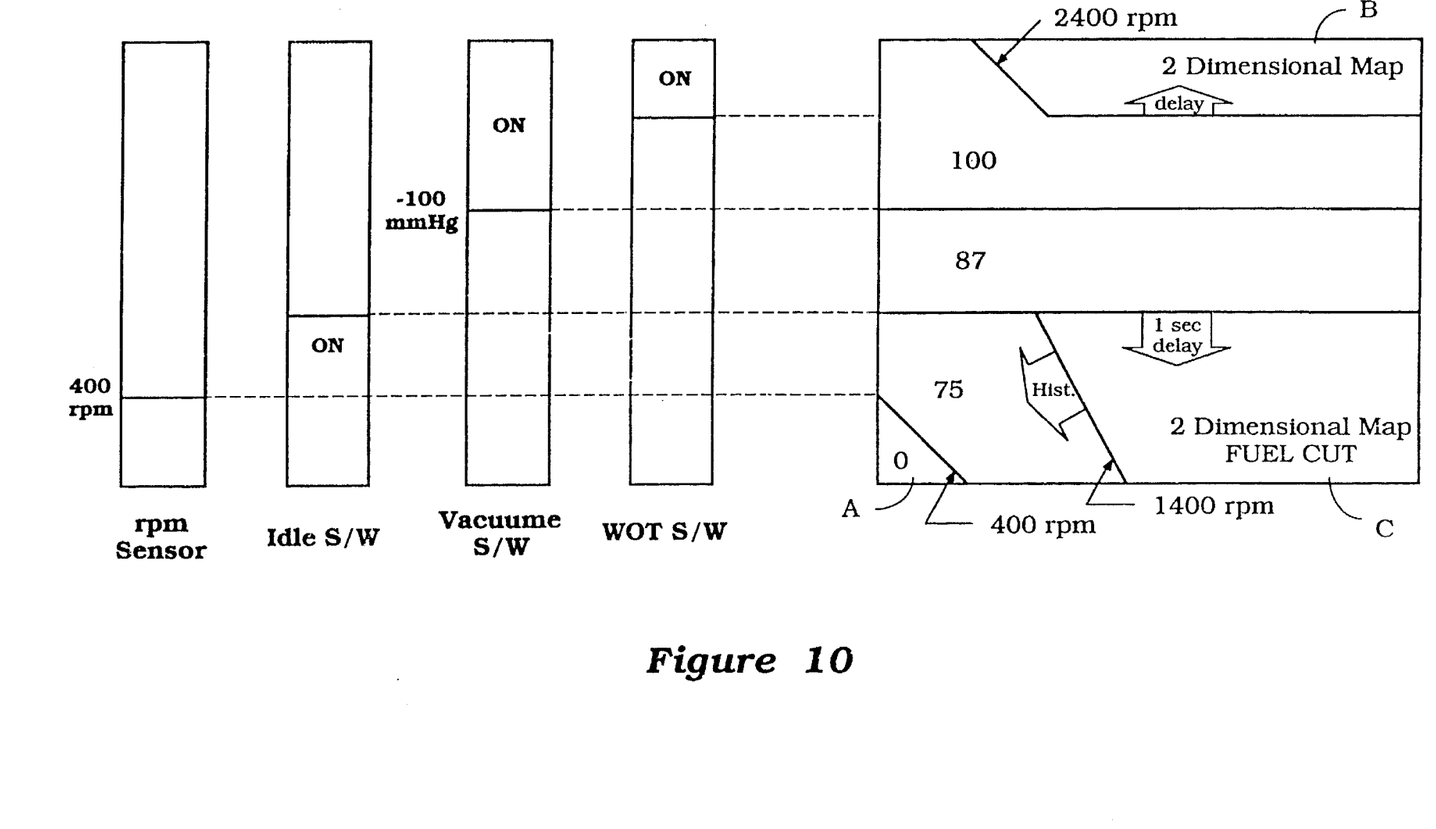
FIG. 10 is a diagram showing the air-fuel ratio control map and is useful in understanding the description of the embodiments of FIGS. 6–9 and shows the various control routines in response to engine speed, idle switch condition, manifold vacuum, and wide open throttle switch conditions.

As has been noted, during normal engine running conditions, the feedback control will be effective to maintain the air-fuel ratio at the desired λ1 condition, and good fuel economy and exhaust emission control can be enjoyed. However, as has also been noted, there are certain conditions when feedback control is not either feasible or appropriate, and some of these conditions will now be described by reference to FIGS. 6–10. FIG. 10 actually shows the various control stages in response to certain engine conditions and will be referred to along with the various block diagrams that describe these abnormal conditions.

Figure 6:
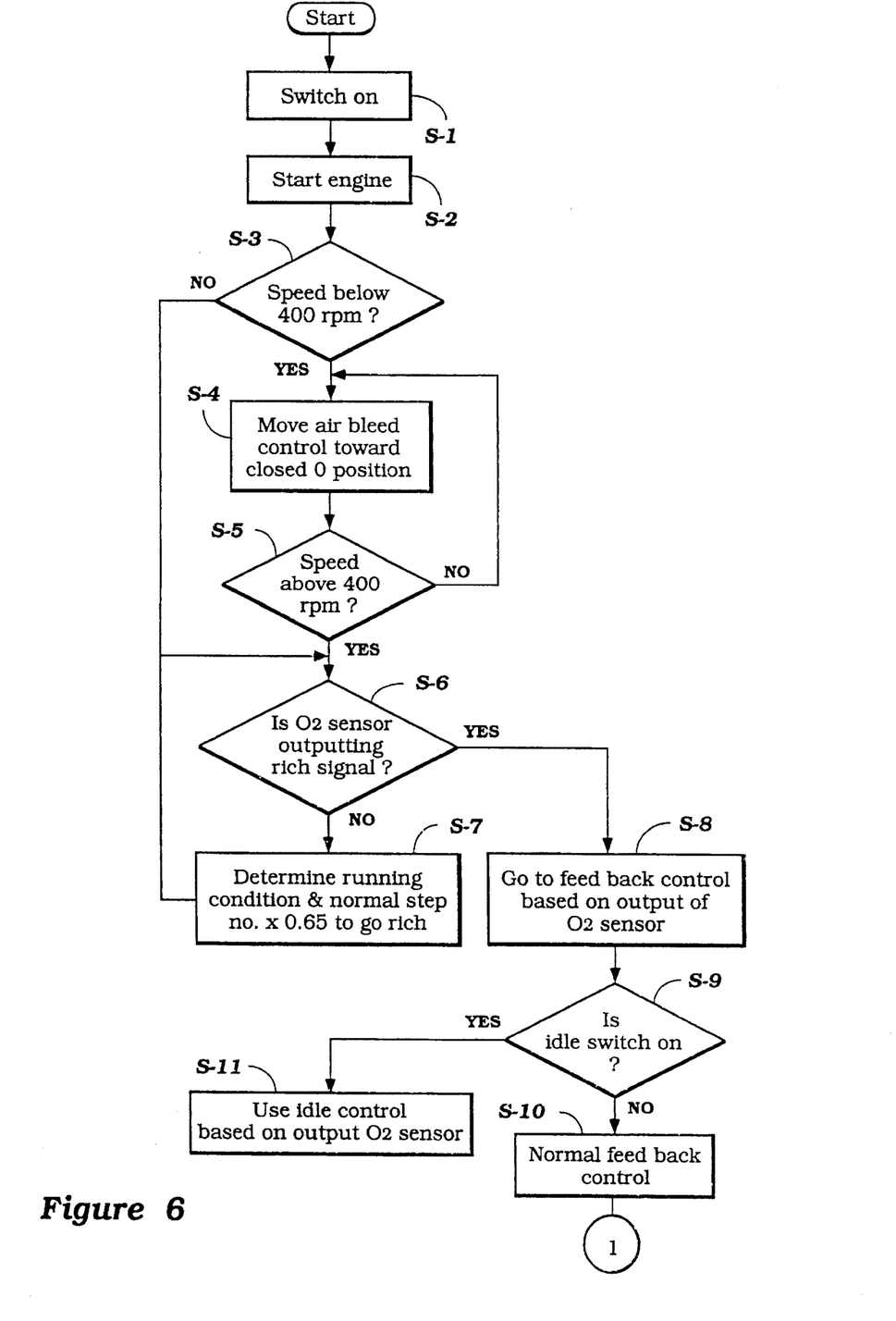
FIG. 6 is a block diagram showing the control routine for engine start-up and determination when to go to feedback control.

The first condition which will be described by reference to FIGS. 6 and 10 is the initial start-up operation. Obviously, during initial start-up it is not possible to employ feedback control during cranking, and also after the engine starts and until the oxygen sensor 87 is at its operating temperature. Referring to FIG. 6, the program starts and then moves to the step S1 where the ignition switch is turned on. The program then moves to the step S2 so as to initiate the engine starting operation by beginning cranking of the engine by actuating its starter in a well-known manner.

The program then moves to the step S3 to read the engine speed so as to determine if the engine is running under its own power. In this embodiment this is determined by comparing actual speed with a speed at which the engine will be running on its own and which is faster than the cranking speed. In the illustrated embodiment, this speed is selected as 400 rpm. If the engine speed is below 400 rpm, it is assumed that the engine still has not started, and the program moves to the step S4 so as to actuate the air bleed control valve 74 by operating the stepper motor 76 toward its closed position. This may be done in one or a number of steps. After the stepper motor 76 is actuated, the program then moves to the step S5 so as to determine if the engine speed is above 400 rpm to determine if the engine is running on its own. If it is not, the program repeats back to the step S4, and the stepper motor 76 is continued to operate through a predetermined number of steps to move the air bleed valve 74 to its closed position.

This case is the control routine area defined at A in the air-fuel control map shown in FIG. 11. It will be seen when the engine speed is below 400 rpm and the idle switch is on, then the control routine in this domain is followed and the air bleed valve 74 is moved toward its zero or closed position.

Once the engine is determined at the step S5 to be running on its own because the engine speed is over 400 rpm, the program then moves to the step S6 to determine if the oxygen sensor 87 is outputting a rich signal. As has been previously noted, the oxygen sensor does not output a signal until it is at its operating temperature (about 350° C.). Hence, if at the step S6 it is determined that the oxygen sensor is not outputting a rich signal, the program moves to the step S7 so as to set the air bleed valve 74 in response to the normal, previously determined setting for the given running condition multiplied by a factor so as to set the system to operate on the rich side so as to have the oxygen sensor heated more rapidly. A multiplying factor such as 0.65 is depicted in the diagram of FIG. 6.

It should be noted that when in the control mode of step S7 it is only determined whether the engine is operating at idle, low load, or high load. From these three conditions, a map is utilized to determine the desired step number and this number is multiplied by 0.65 as previously noted at the step S7. The program then repeats back to the step S6 from the step S7 so as to continue to monitor to determine when the oxygen sensor 87 is outputting a rich signal.

When at the step S6 it is determined that the oxygen sensor 87 is outputting a rich signal, then the program moves to the step S8 so establish feedback control dependent upon the output of the oxygen sensor 87. From the step S8, the program moves to the step S9 to determine if idle or normal feedback control is to be employed by determining the condition of a idle switch which determines that the throttle valve is in its idle position. If the idle switch is not on, the program moves to the step S10, so as to use normal feedback control from the output of the oxygen sensor.

If, however, at the step S9 it is determined that the idle switch is on, then the program moves to the step S11 so as to perform idle control in accordance with an idle control routine based again on the output of the oxygen sensor 87.

Figure 7:
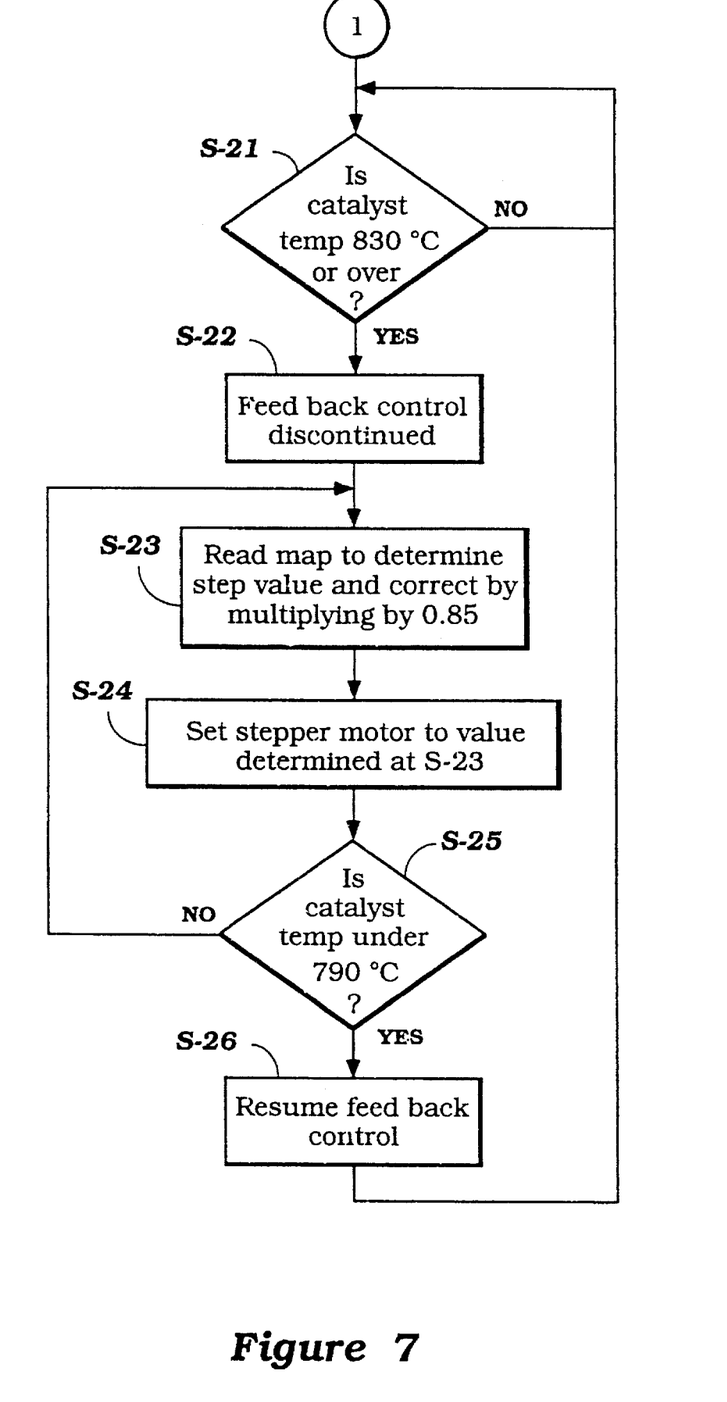
FIG. 7 is a block diagram showing the control routine employed when the catalyst temperature exceeds a predetermined temperature.

Once the ECU 84 has selected the normal feedback control, indicated at ① in FIG. 6, then the program continues to monitor the condition of the catalyst temperature as determined by the temperature probe 86 in accordance with the routine of FIG. 7. Basically, this routine functions so as to maintain feedback control unless the catalyst temperature rises to a dangerous temperature such as 820° C. or higher. At that time feedback control is discontinued and a rich mixture is provided so as to bring the catalyst temperature back down to a normal temperature. The catalyst temperature is monitored, as shown in FIG. 7 at the step S21, to determine if it is 830° C. or over. If it is not, the program repeats back.

If at the step S21 it is determined that the catalyst temperature is 830° C. or over, then the program moves to the step S22 so as to discontinue feedback control. The program then moves to the step S23 to read a step number for the stepper motor 76 so as to operate the bleed control valve 74 to a position so as to provide a leaner mixture based upon a two-dimensional map setting forth engine speed and step number as set out below.

TABLE 1

| WOT Two Dimensional Map | | | | | |
|---|---|---|---|---|---|
| Engine RPM | 2800 | 3200 | 3600 | 4000 | 4400 |
| Step Number | 120 | 130 | 130 | 130 | 130 |

The steps indicated above are the total number of steps from close to open. In the illustrated and described embodiments, the fully opened 100% position shown in FIGS. 3–5 comprises a 200 step position while the fully closed position is the zero position.

Once the value is read from the two-dimensional map, then it is corrected by multiplying it by a correction factor so as to provide enriching of the fuel, and the multiplying factor chosen in the described embodiment is 0.85. As a result, the step number will be reduced from the map and the mixture enriched so as to bring the catalyst temperature down.

The program then moves to the step S24 so as to actually drive the stepper motor 76 to the corrected step as set at step S23.

The program then moves to the step S25 to again read the temperature of the catalyst by the temperature probe 86. If the temperature has still not fallen below 790° C., the program moves back to the step S23 and continues to provide a rich mixture so as to lower the catalyst temperature in accordance with the map of Table 1 and also the corrected factor as applied at the step S23.

If, however, at the step S25 it is determined that the catalyst temperature has fallen to below 790° C., the program then moves to the step S26 so as to resume normal feedback control of the stepper motor 76 and bleed valve 74.

Figure 8:
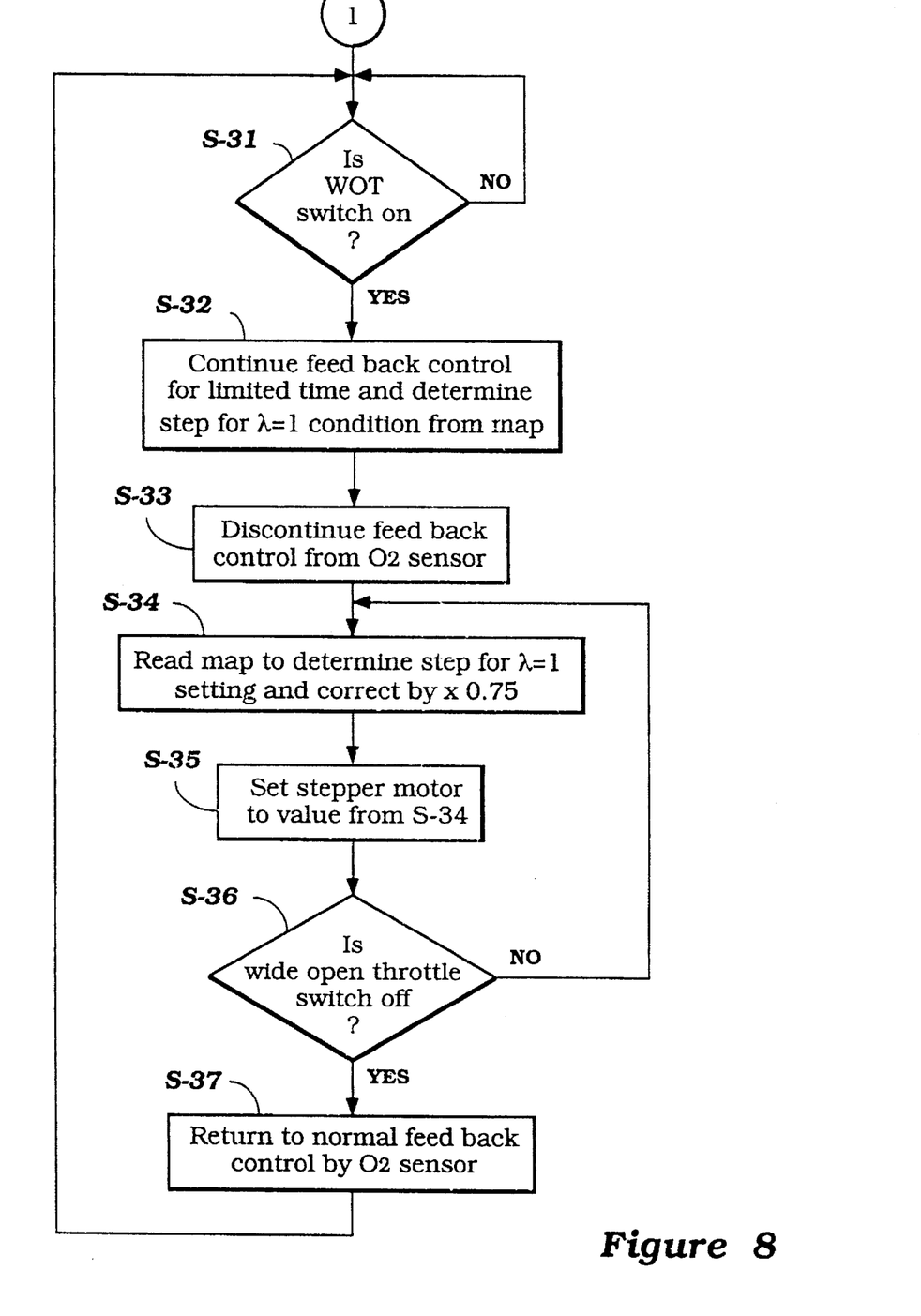
FIG. 8 is a block diagram showing the method of operation during wide open throttle conditions to avoid the possibility of catalyst overheating.

Another condition when pure feedback control is not satisfactory for engine operation is when operating at a wide open throttle. Under this condition, feedback control may not be adequate to avoid overheating of the catalyst, and FIG. 8 shows a routine for use under wide open throttle and which will reduce the likelihood of catalyst overheating under this control routine by deviating from feedback control, as will be described. This routing also uses the map of Table 1.

This control routine continues on after the normal control routine initiated at the end of engine start-up indicated by the point ① in FIG. 6. The program, in accordance with this routine of the ECU 84, then moves to the step S31 to determine if a wide open throttle switch is turned on. Such a wide open throttle switch can be mounted in the body of the carburetor 22 along with the idle switch, and will determine when the throttle valve 71 is positioned in its wide open throttle position. If it is not, the program repeats.

If, however, at the step S31 it is determined that the wide open throttle switch is on, then the program moves to the step S32 that continues the feedback control for a limited time period while determining the appropriate step number for a λ1 condition from a two-dimensional map. Such a map can be the map of Table 1, which is the wide open throttle two-dimensional map, and the step numbers are read from this map for the actual engine speed. The program then moves to the step S33 to discontinue feedback control based upon the output of the oxygen sensor 87. The program then moves to the step S34 to move into the control routine phase shown at B in FIG. 10.

The program then moves to the step S34 to read the map of Table 1 to determine the setting necessary for the λ1 condition from pre-mapped actual data and then corrects this by multiplying the step number from the map by the corrected factor, such as 0.75, so as to provide a richer than otherwise fuel mixture. The program then moves to the step S35 so as to execute the control of the stepper motor 76 and bleed valve 74 to the value determined at the step S34.

The program then moves to the step S36 to determine if the wide open throttle switch is still on or has been turned off. If it has not been turned off, the program moves back to the step S34 and continues to enrich the mixture by decreasing the step value by one or more steps at a time. This program is continued until at the step S36 it is determined that the wide open throttle switch is turned off. The program then moves to the step S34 to resume normal feedback control by the output of the oxygen sensor 87.

As has been noted, another condition when feedback control may not be desirable is on extreme decelerations. Therefore, the deceleration control routine of FIG. 9 is employed during rapid decelerations and will now be described by particular reference to that figure as well as FIG. 10.

The program continues on at the point ① from the normal control routine established as seen in FIG. 6 and begins this control routine at the step S41 by determining if the idle switch is on and the engine speed is either over 1400 rpm or the intake manifold absolute vacuum is greater than 600 mm of mercury. This speed and manifold vacuum are typical for a certain engine and would indicate a condition that the engine has been traveling at a high speed and the throttle has been rapidly closed, conditions indicative of rapid deceleration shutoff.

The program then moves to the step S42 to discontinue the feedback control from the oxygen sensor 87 (FIG. 1). The program then moves to the step S43 so as to read a two-dimensional map, such as that set forth in Table 2 which follows, so as to determine the appropriate step position for the engine speed to establish fuel cutoff.

TABLE 2

| Two Dimensional map for Fuel Cutoffs | | | | |
|---|---|---|---|---|
| Engine RPM | 1700 | 2000 | 2500 | 3000 |
| Step Number | 120 | 150 | 180 | 200 |

The program then moves to the step S44 so as to actually initiate the control of the stepper motor 73 and bleed valve 74 from the ECU 84 to the value determined at the step S43.

The program then moves to the step S45 to determine if the idle switch has been turned off and the speed is under 1400 rpm or the absolute manifold vacuum is less than 580 mm of mercury, a value somewhat lower than that used at step S41. If it is not, the program repeats back to the step S41, and the fuel cutoff-based step control is continued.

If, however, at the step S45 it is determined that none of the above conditions has been met, that is, that the idle switch has not been turned off, the speed has not fallen below 1400 rpm, or the absolute manifold vacuum has not fallen below 580 mm of mercury, then the program moves to the step S46 so as to return to feedback control from the output of the oxygen sensor 87. The program then moves to the step S47 to determine if the idle switch has been returned to the "on" condition. If it has not, the program then returns back to the step S41 to determine if another deceleration condition that requires fuel cutoff has been reached. If not, the program moves to the step S48 to resume idle feedback control by the oxygen sensor.

It should be readily apparent from the foregoing description that the described embodiments of the invention provide very effective control for a gaseous fueled engine to maintain a stoichiometric ratio under all running conditions either utilizing an oxygen sensor for feedback control or under certain conditions employing control independently of the feedback control but in accordance with pre-mapped conditions so as to achieve optimum results under all conditions. In addition, the arrangement provides a deceleration fuel cutoff without requiring a separate fuel shut-off valve for this purpose. Of course, the foregoing description is that of preferred embodiments of the invention, and various changes and modifications may be made without departing from the spirit and scope of the invention, as defined by the appended claims.

I claim:

1. A gaseous fueled engine having an induction system including a charge former for supplying a fuel-air mixture to said engine and comprising an induction passage for receiving atmospheric air and a fuel supply circuit for receiving gaseous fuel from a source of gaseous fuel stored under pressure and mixing said fuel with the air in said induction passage for forming a fuel-air mixture for said engine, an air bleed passage communicating an atmospheric air inlet with said fuel supply circuit, an automatic air bleed control valve in said air bleed passage for controlling the amount of air bled into said fuel supply circuit to control the mixture strength, an engine combustion sensor for detecting the air-fuel ratio, feedback control means for receiving a signal from said engine combustion sensor and controlling said automatic air bleed valve to maintain the desired air-fuel ratio, means for sensing a condition different from a normal steady-state running condition of said engine, and means for discontinuing feedback control of said automatic air bleed valve under the sensing of said condition and regardless of whether the feedback control system and engine are in such a state that feedback control could be operative and operating said automatic air bleed valve with a different control strategy and without utilizing the output of said engine combustion condition sensor.

2. A gaseous fueled engine as in claim 1, further including a catalyst in the exhaust system and the means for sensing the condition senses the temperature of the catalyst and feedback control is discontinued in response to the sensed temperature.

3. A gaseous fueled engine as in claim 2, wherein the feedback control is discontinued when the temperature in the catalyst is above a predetermined temperature higher than the normal operating temperature of the catalyst.

4. A gaseous fueled engine as in claim 3, further including means for controlling the air bleed valve in response to a map of predetermined engine conditions when the feedback control is discontinued.

5. A gaseous fueled engine as in claim 4, wherein the bleed valve is progressively closed during the time when the catalyst temperature is higher than the predetermined temperature in order to enrich the mixture until the catalyst temperature falls below the predetermined temperature.

6. A gaseous fueled engine as in claim 4, further including the returning to the feedback control when the catalyst temperature falls below a second predetermined temperature lower than the first predetermined temperature.

7. A gaseous fueled engine as in claim 1, further including a throttle control for controlling the speed of the engine and a throttle position switch providing an output signal indicative of wide open throttle which is the condition determined to be different from the normal condition.

8. A gaseous fueled engine as in claim 7, wherein the feedback control is continued for a brief period of time after the throttle is determined to be in its wide open throttle position by the output from the throttle position sensor and then the feedback control is discontinued if the throttle is still wide open.

9. A gaseous fueled engine as in claim 8, further including a map of preprogrammed air bleed control positions in response to engine speed and wherein the air bleed valve is controlled from said map when the feedback control is discontinued.

10. A gaseous fueled engine as in claim 9, wherein the map provides a richer than normal mixture under wide open throttle conditions.

11. A gaseous fueled engine as in claim 10, wherein the control returns to normal feedback control when the throttle position sensor indicates that the throttle valve is no longer in a wide open throttle condition.

12. A gaseous fueled engine as in claim 1, wherein the sensed condition different from the normal condition comprises a rapid deceleration condition.

13. A gaseous fueled engine as in claim 12, wherein the engine includes a throttle valve and a throttle position sensor and wherein the rapid deceleration is sensed by the combination of the throttle valve being positioned in its idle position and the engine speed or engine induction system vacuum being greater than a predetermined value.

14. A gaseous fueled engine as in claim 13, further including a preprogrammed map indicative of air bleed control valve position and engine speed and wherein the air bleed control valve is controlled by the map when feedback control is discontinued.

15. A gaseous fueled engine as in claim 14, wherein the map produces a progressive cutoff of fuel supply in response to rapid deceleration.

16. A gaseous fueled engine as in claim 14, wherein the control is returned to feedback control when either the throttle valve is not in its idle position, the engine speed falls below the predetermined engine speed or the intake manifold vacuum falls below the predetermined value.

17. A gaseous fueled engine as in claim 1, wherein the charge former comprises an air valve type carburetor having a pressure control valve in the induction passage for maintaining a constant pressure drop thereacross and a main fuel metering valve operatively connected to said air valve for controlling the rate of discharge of the fuel into the induction passage.

18. A gaseous fueled engine as in claim 17, further including a catalyst in the exhaust system and the means for sensing the condition senses the temperature of the catalyst and feedback control is discontinued in response to the sensed temperature.

19. A gaseous fueled engine as in claim 18, wherein the feedback control is discontinued when the temperature in the catalyst is above a predetermined temperature higher than the normal operating temperature of the catalyst.

20. A gaseous fueled engine as in claim 19, further including means for controlling the air bleed valve in response to a map of predetermined engine conditions when the feedback control is discontinued.

21. A gaseous fueled engine as in claim 20, wherein the bleed valve is progressively closed during the time when the catalyst temperature is higher than the predetermined temperature in order to enrich the mixture until the catalyst temperature falls below the predetermined temperature.

22. A gaseous fueled engine as in claim 20, further including the returning to the feedback control when the catalyst temperature falls below a second predetermined temperature lower than the first predetermined temperature.

23. A gaseous fueled engine as in claim 17, further including a throttle control for controlling the speed of the engine and a throttle position switch providing an output signal indicative of wide open throttle which is the condition determined to be different from the normal condition.

24. A gaseous fueled engine as in claim 23, wherein the feedback control is continued for a brief period of time after the throttle is determined to be in its wide open throttle position by the output from the throttle position sensor and then the feedback control is discontinued if the throttle is still wide open.

25. A gaseous fueled engine as in claim 24, further including a map of preprogrammed air bleed control positions in response to engine speed and wherein the air bleed valve is controlled from said map when the feedback control is discontinued.

26. A gaseous fueled engine as in claim 25, wherein the map provides a richer than normal mixture under wide open throttle conditions.

27. A gaseous fueled engine as in claim 26, wherein the control returns to normal feedback control when the throttle position sensor indicates that the throttle valve is no longer in a wide open throttle condition.

28. A gaseous fueled engine as in claim 17, wherein the sensed condition different from the normal condition comprises a rapid deceleration condition.

29. A gaseous fueled engine as in claim 28, wherein the engine includes a throttle valve and a throttle position sensor and wherein the rapid deceleration is sensed by the combination of the throttle valve being positioned in its idle position and the engine speed or engine induction system vacuum being greater than a predetermined value.

30. A gaseous fueled engine as in claim 29, further including a preprogrammed map indicative of air bleed control valve position and engine speed and wherein the air bleed control valve is controlled by the map when feedback control is discontinued.

31. A gaseous fueled engine as in claim 30, wherein the map produces a progressive cutoff of fuel supply in response to rapid deceleration.

32. A gaseous fueled engine as in claim 31, wherein the control is returned to feedback control when either the throttle valve is not in its idle position, the engine speed falls below the predetermined engine speed or the intake manifold vacuum falls below the predetermined value.

33. A method of operating a gaseous fueled engine having an induction system including a charge former for supplying a fuel-air mixture to said engine and comprising an induction passage for receiving atmospheric air and a fuel supply circuit for receiving gaseous fuel from a source of gaseous fuel stored under pressure and mixing said fuel with the air in said induction passage for forming a fuel-air mixture for said engine, an air bleed passage communicating an atmospheric air inlet with said fuel supply circuit, an automatic air bleed control valve in said air bleed passage for controlling the amount of air bled into said fuel supply circuit to control the mixture strength, an engine combustion sensor for detecting the air-fuel ratio, said method comprising the steps of receiving a signal from said engine combustion sensor and controlling said automatic air bleed valve to maintain the desired air-fuel ratio, sensing a condition different from a normal steady-state running condition of said engine, and discontinuing feedback control of said automatic air bleed valve under the sensing of said condition even though the condition of the engine and feedback control system are such that feedback control would be possible and operating said automatic air bleed valve with a different control strategy and without utilizing the output of said engine combustion condition sensor.

34. A method of operating a gaseous fueled engine as in claim 33, further including a catalyst in the exhaust system and the condition sensed is the temperature of the catalyst and feedback control is discontinued in response to the sensed temperature.

35. A method of operating a gaseous fueled engine as in claim 34, wherein the feedback control is discontinued when the temperature in the catalyst is above a predetermined temperature higher than the normal operating temperature of the catalyst.

36. A method of operating a gaseous fueled engine as in claim 35 further including the steps of controlling the air bleed valve in response to a map of predetermined engine conditions when the feedback control is discontinued.

37. A method of operating a gaseous fueled engine as in claim 36, wherein the bleed valve is progressively closed during the time when the catalyst temperature is higher than the predetermined temperature in order to enrich the mixture until the catalyst temperature falls below the predetermined temperature.

38. A method of operating a gaseous fueled engine as in claim 36, further including the step of returning to the feedback control when the catalyst temperature falls below a second predetermined temperature lower than the first predetermined temperature.

39. A method of operating a gaseous fueled engine as in claim 33, further including a throttle control for controlling the speed of the engine and the condition determined is wide open throttle position.

40. A method of operating a gaseous fueled engine as in claim 39, wherein the feedback control is continued for a brief period of time after the throttle is determined to be in its wide open throttle position and then the feedback control is discontinued if the throttle is still wide open.

41. A method of operating a gaseous fueled engine as in claim 40, further including the steps of controlling the air bleed valve from a map when the feedback control is discontinued.

42. A method of operating a gaseous fueled engine as in claim 41, wherein the map provides a richer than normal mixture under wide open throttle conditions.

43. A method of operating a gaseous fueled engine as in claim 42, wherein normal feedback control is resumed when the valve is no longer in a wide open throttle condition.

44. A method of operating a gaseous fueled engine as in claim 33, wherein the sensed condition different from the normal condition comprises a rapid deceleration condition.

45. A method of operating a gaseous fueled engine as in claim 44, wherein the engine includes a throttle valve and a throttle position sensor and wherein the rapid deceleration is determined by the combination of the throttle valve being positioned in its idle position and its engine speed or engine induction system vacuum being greater than a predetermined value.

46. A method for operating a gaseous fueled engine as in claim 45, further including the steps of controlling the air bleed control valve by the map when feedback control is discontinued.

47. A method for operating a gaseous fueled engine as in claim 46, wherein the map produces a progressive cutoff of fuel supply in response to rapid deceleration.

48. A method of operating a gaseous fueled engine as in claim 46, wherein the control is returned to feedback control when either the throttle valve is not in its idle position, the engine speed falls below the predetermined engine speed or the intake manifold vacuum falls below the predetermined value.

49. A gaseous fueled engine having an induction system including a charge former for supplying a fuel-air mixture to said engine and comprising an induction passage for receiving atmospheric air and a fuel supply circuit for receiving gaseous fuel from a source of gaseous fuel stored under pressure and mixing said fuel with the air in said induction passage for forming a fuel-air mixture for said engine, an air bleed passage communicating an atmospheric air inlet with said fuel supply circuit, an automatic air bleed control valve in said air bleed passage for controlling the amount of air bled into said fuel supply circuit to control the mixture strength, an engine combustion sensor for detecting the air-fuel ratio, feedback control means for receiving a signal from said engine combustion sensor and controlling said automatic air bleed valve to maintain the desired air-fuel ratio, a throttle control for controlling the speed of said engine, a throttle position switch providing an output signal indicative of wide open throttle, and means for discontinuing feedback control of said automatic air bleed valve when said throttle position sensor outputs a signal indicative of wide open throttle.

50. A gaseous fueled engine as in claim 49, wherein the feedback control is continued for a brief period of time after the throttle is determined to be in its wide open throttle position by the output from the throttle position sensor and then the feedback control is discontinued if the throttle is still wide open.

51. A gaseous fueled engine as in claim 50, further including a map of preprogrammed air bleed control positions in response to engine speed and wherein the air bleed valve is controlled from said map when the feedback control is discontinued.

52. A gaseous fueled engine as in claim 51, wherein the map provides a richer than normal fuel air ratio under wide open throttle conditions.

53. A gaseous fueled engine as in claim 52, wherein the control returns to normal feedback control when the throttle position sensor indicates that the throttle valve is no longer in a wide open throttle condition.

54. A gaseous fueled engine as in claim 49, wherein the charge former comprises an air valve type carburetor having a pressure control valve in the induction passage for maintaining a constant pressure drop thereacross and a main fuel metering valve operatively connected to said air valve for controlling the rate of discharge of the fuel into the induction passage.

55. A gaseous fueled engine as in claim 54, wherein feedback control is also discontinued upon the engine the staring of the engine.

56. A gaseous fueled engine as in claim 55, wherein feedback control is discontinued on the initiation of starting and the air bleed control valve is moved toward a closed position upon starting for enriching the fuel/air mixture supplied to the engine during starting.

57. A gaseous fueled engine as in claim 55, wherein the engine combustion sensor comprises an oxygen sensor which does not output a signal until it reaches a predetermined operating temperature and further including means for monitoring the output of the sensor to determine if it is outputting a rich signal and discontinuing feedback control until the oxygen sensor outputs a signal indicative of a rich temperature.

58. A gaseous fueled engine as in claim 57, further including the returning of the operation to feedback control immediately upon the output of a signal from the oxygen sensor.

59. A gaseous fueled engine as in claim 58, wherein the automatic air bleed control valve is positioned in a position determined by a map of predetermined conditions during the time when the oxygen sensor is not outputting a signal.

60. A method of operating a gaseous fueled engine having an induction system including a charge former for supplying a fuel-air mixture to said engine and comprising an induction passage for receiving atmospheric air and a fuel supply circuit for receiving gaseous fuel from a source of gaseous fuel stored under pressure and mixing said fuel with the air in said induction passage for forming a fuel-air mixture for said engine, an air bleed passage communicating an atmospheric air inlet with said fuel supply circuit, an automatic air bleed control valve in said air bleed passage for controlling the amount of air bled into said fuel supply circuit to control the mixture strength, an engine combustion sensor for detecting the air-fuel ratio, a throttle control for controlling the speed of the engine, said method comprising the steps of receiving a signal from said engine combustion sensor and controlling said automatic air bleed valve to maintain the desired air-fuel ratio, sensing when the throttle control is in a wide open throttle condition, and discontinuing feedback control of said automatic air side open throttle condition bleed valve under the sensing of said condition.

61. A method of operating a gaseous fueled engine as in claim 60, wherein the feedback control is continued for a brief period of time after the throttle is determined to be in its wide open throttle position and then the feedback control is discontinued if the throttle is still wide open.

62. A method of operating a gaseous fueled engine as in claim 61, further including the steps of controlling the air bleed valve from a map when the feedback control is discontinued.

63. A method of operating a gaseous fueled engine as in claim 62, wherein the map provides a richer than normal mixture under wide open throttle conditions.

64. A method of operating a gaseous fueled engine as in claim 63, wherein normal feedback control is resumed when the valve is no longer in a wide open throttle condition.

* * * * *